(12) United States Patent
Benosman et al.

(10) Patent No.: US 9,213,902 B2
(45) Date of Patent: Dec. 15, 2015

(54) METHOD OF ESTIMATING OPTICAL FLOW ON THE BASIS OF AN ASYNCHRONOUS LIGHT SENSOR

(71) Applicants: Universite Pierre et Marie Curie (Paris 6), Paris (FR); Centre National de la Recherche Scientifique—CNRS, Paris (FR)

(72) Inventors: Ryad Benosman, Paris (FR); Siohoi Ieng, Paris (FR)

(73) Assignees: UNIVERSITE PIERRE ET MARIE CURIE (PARIS 6), Paris (FR); CENTRE NATIONAL DE LA RECHERCHE SCIENTIFIQUE—CNRS, Paris (FR)

(*) Notice: Subject to any disclaimer, the term of this patent is extended or adjusted under 35 U.S.C. 154(b) by 0 days.

(21) Appl. No.: 14/366,103

(22) PCT Filed: Dec. 21, 2012

(86) PCT No.: PCT/FR2012/053066
§ 371 (c)(1),
(2) Date: Jun. 17, 2014

(87) PCT Pub. No.: WO2013/093378
PCT Pub. Date: Jun. 27, 2013

(65) Prior Publication Data
US 2014/0363049 A1    Dec. 11, 2014

(30) Foreign Application Priority Data
Dec. 21, 2011   (FR) ...................................... 11 62137

(51) Int. Cl.
*G06K 9/00*    (2006.01)
*G06T 7/20*    (2006.01)

(52) U.S. Cl.
CPC .......... *G06K 9/00771* (2013.01); *G06T 7/2066* (2013.01)

(58) Field of Classification Search
None
See application file for complete search history.

(56) References Cited

U.S. PATENT DOCUMENTS

| | | | |
|---|---|---|---|
| 8,509,489 B2 * | 8/2013 | Chen | 382/107 |
| 8,526,681 B2 * | 9/2013 | Akutsu | 382/107 |
| 8,665,333 B1 * | 3/2014 | Sharma et al. | 348/159 |

(Continued)

OTHER PUBLICATIONS

Benosman et al., "Asynchronous frameless event-based optical flow," Neural Networks, 27:32-37 (2011) XP055035741.

(Continued)

*Primary Examiner* — Tahmina Ansari
(74) *Attorney, Agent, or Firm* — McAndrews, Held & Malloy Ltd

(57) ABSTRACT

A computer receives asynchronous information originating from a light sensor (10) having a pixel matrix disposed opposite a scene. The asynchronous information comprises, for each pixel of the matrix, successive events originating from this pixel and depending on variations in light in the scene. For a place of estimation (p) in the matrix of pixels and an estimation time (t), the computer selects a set (Sp t) of events originating from pixels included in a spatial neighborhood (πp) of the place of estimation and which have occurred in a time interval (Θ) defined with respect to the estimation time, such that this set has at most one event per pixel of the spatial neighborhood. The computer quantifies the variations in the times of occurrence of the events of the set selected as a function of the positions, in the matrix, of the pixels from which these events originate.

21 Claims, 4 Drawing Sheets

(56) References Cited

U.S. PATENT DOCUMENTS

| | | | |
|---|---|---|---|
| 2002/0085092 A1* | 7/2002 | Choi et al. | 348/77 |
| 2007/0280507 A1* | 12/2007 | Murali | 382/107 |
| 2013/0335595 A1* | 12/2013 | Lee et al. | 348/231.5 |
| 2014/0037139 A1* | 2/2014 | Lee et al. | 382/103 |
| 2014/0286537 A1* | 9/2014 | Seki et al. | 382/107 |
| 2014/0363049 A1* | 12/2014 | Benosman et al. | 382/103 |

OTHER PUBLICATIONS

Bartolozzi et al., "Attentive motion sensor for mobile robotic applications," Circuits and Systems (ISCAS), pp. 2813-2816 (2011) XP032109722.

Delbruck, "Frame-free dynamic digital vision," Proc. Int. Symp. on Secure-Life Electronics, Advanced Electronics for Quality Life and Society, Univ. of Tokyo, Mar. 6-7, pp. 21-26 (2008) XP055035734.

Lichtsteiner et al., "A 128×128 120 dB 15 us Latency Asynchronous Temporal Contrast Vision Sensor," IEEE J. Solid-State Circuits, 43(2):566-576 (2008) XP011200748.

Benosman et al., "Asynchronous Event-Based Hebbian Epipolar Geometry," IEEE Transactions on Neural Networks, 22(11):1723-1734 (2011) XP011411486.

Barron et al., "Performance of Optical Flow Techniques," IJCV, 12(1):43-77 (1994).

Delbruck et al., "Activity-Driven, Event-Based Vision Sensors," Proc. 2010 IEEE Int. Symp. Circuits and Systems (ISCAS), pp. 2426-2429 (2010).

* cited by examiner

METHOD OF ESTIMATING OPTICAL FLOW ON THE BASIS OF AN ASYNCHRONOUS LIGHT SENSOR

The present application is filed pursuant to 35 U.S.C. 371 as a U.S. National Phase application of International Patent Application No. PCT/FR2012/053066, which was filed Dec. 21, 2012, claiming the benefit of priority to French Patent Application No. 1162137, which was filed on Dec. 21, 2011. The entire text of the aforementioned applications is incorporated herein by reference in its entirety.

BACKGROUND

The present invention relates to methods for estimating optical flow in imaging techniques.

Optical flow is an approximation of the motion in a sequence of images varying over time. The first work on optical flows was done by engineers in the field of television and by persons interested in the modeling of biological vision. Since then, these techniques have found their place in a wide variety of disciplines, including computer vision and robot navigation. In particular, they are used to perform motion detection, object segmentation, calculations of collision time, motion-compensated encoding etc.

Optical flow is a visual measurement notoriously affected by noise. It is currently expressed as a velocity map within the image sequence. But estimating such map assumes the solving of an ill-defined problem, i.e. including too many unknowns in relation to the number of equations. As a consequence, to estimate flow vectors, additional hypotheses and constraints must be applied. However, these hypotheses and constraints are not always valid. Furthermore, the inevitable presence of stochastic noise in unfiltered natural image sequences gives rise to various difficulties connected to its use in the control loop of a mobile robot.

Optical flow techniques can be divided into four categories (cf. J. L. Barron, et al., "Performance of Optical Flow Techniques", International Journal of Computer Vision, Vol. 12, No. 1, pp. 43-77):

- energy-based methods express optical flow according to the outputs of velocity-adapted filters defined in the Fourier domain;
- phase-based methods estimate the image velocities in terms of band-pass filter outputs;
- correlation-based methods seek the best match between small spatial neighborhoods in temporally adjacent images;
- differential, or gradient-based, methods use spatio-temporal derivatives of the image intensity and a hypothesis of constant illumination.

The majority of work done on the design, comparison and application of optical flow techniques concentrates on correlation- or gradient-based approaches. However, all these methods suffer intrinsically from slowness of execution, so that they are poorly adapted to real-time execution constraints, which can exist in a certain number of applications.

Another motion detection solution relies on a visual sensor known as EMD (Elementary Motion Detector). EMDs are based on motion detection models reproducing supposed vision mechanisms of insects. Two adjacent photoreceptors are used to supply image signals that are then supplied to a bank of time-based high-pass and low-pass filters. The high-pass filters remove the continuous component of the illumination which does not carry any motion information. Then the signal is subdivided between two channels, only one of which includes a low-pass filter. The delay applied by the low-pass filter is employed to supply a delayed image signal which is then correlated with that of the adjacent non-delayed channel. Finally, a subtraction between the two channels supplies a response having sensitivity to the direction of motion, which can therefore be employed to measure visual motion. Motion detection by an EMD is sensitive to image contrast, the amplitude of the detected motion being larger when there is a high contrast. This disturbs the precision of the measurement of visual motions. Due to this lack of precision, EMDs are not suitable for general navigation applications, especially for tasks requiring fine motion control.

Unlike conventional cameras that record successive images at predefined instants of sampling, biological retinas only transmit a small amount of redundant information about the scene to be visualized, and do so in an asynchronous way. Event-based asynchronous vision sensors deliver compressed digital data in the form of events. A general presentation of such sensors can be consulted in "Activity-Driven, Event-Based Vision Sensors", T. Delbrück, et al., Proceedings of 2010 IEEE International Symposium on Circuits and Systems (ISCAS), pp. 2426-2429. Event-based vision sensors have the advantage of removing redundancy, reducing latency time and increasing the dynamic range compared to conventional cameras.

The output of such a vision sensor can consist, for each pixel address, in a sequence of asynchronous events representing changes in scene reflectance at the moment they occur. Each pixel of the sensor is independent and detects changes in intensity above a threshold since the emission of the last event (for example a contrast of 15% on the logarithm of the intensity). When the intensity change exceeds the fixed threshold, an ON or OFF event is generated by the pixel according to whether the intensity is increasing or decreasing. Since the sensor is not sampled on a clock like a conventional camera, it can take into account the sequencing of the events with a very high degree of temporal precision (for example in the order of 1 µs). If such a sensor is used to reconstruct an image sequence, an image rate of several kilohertz can be attained, as opposed to a few tens of hertz for conventional cameras.

If event-based vision sensors have promising prospects, to this day no practical method exists that is well adapted to determining optical flow on the basis of signals delivered by such sensors. In "Frame-free dynamic digital vision", Proceedings of the International Conference on Secure-Life Electronics, Advanced Electronics for Quality Life and Society, University of Tokyo, 6-7 Mar. 2008, pp. 21-26, T. Delbrück suggests the use of "labelers" to give additional significance to the detected events, such as contour orientations or directions of motion, without however supplying any information that might make it possible to envision the estimation of an optical flow.

In the article "Asynchronous frameless event-based optical flow" which appeared in March 2012 in the "Neural Networks" periodical, Vol. 27, pp. 32-37, R. Benosman et al. describe the estimation of optical flows on the basis of events detected by an asynchronous sensor. The algorithm used is gradient-based and relies on the solving of a system of equations in which the spatial gradients at a given pixel of coordinates (x, y) are estimated by the difference between the events having arisen at this pixel (x, y) and those having arisen at the pixels of coordinates (x−1, y) and (x, y−1) at the same instant.

A need exists for a method for estimating optical flow that makes it possible to make estimations faster than the known practice for conventional cameras. There is also a need for a method for estimating optical flow on the basis of signals output by an event-based vision sensor, in order to be able to use various techniques and applications that have been developed relying on the employment of optical flows.

SUMMARY OF THE INVENTION

A method for estimating optical flow is proposed, comprising:
  receiving asynchronous information originating from a light sensor having a pixel matrix arranged facing a scene, the asynchronous information comprising, for each pixel of the matrix, successive events originating from this pixel and depending on light variations in the scene;
  for a place of estimation in the pixel matrix and an estimation time, selecting a set of events originating from pixels lying in a spatial neighborhood of the place of estimation and having arisen in a time interval defined with respect to the estimation time, the set having at most one event per pixel of the spatial neighborhood; and
  quantizing the variations in the times of occurrence of the events of the selected set as a function of positions, in the matrix, of the pixels from which these events originate.

The method makes use of the fact that the time of occurrence of the latest event at a given pixel position is an increasing monotonic function. This function defines, for the various positions of pixel, a surface whose local variations provide information on the velocity field in the scene as the sensor sees it. The quantization of these variations can be carried out very quickly, with a delay in the order of the response time of the pixels of the sensor, for example below or in the order of the millisecond.

In an embodiment of the method, the quantization of the variations in the times of occurrence of the events of the selected set as a function of the positions of the pixels from which these events originate comprises estimating a slope that the events of the selected set exhibit in a space-time representation around the place of estimation. The selected set of events can previously have been subjected to a smoothing operation in space-time representation, in order to attenuate certain noise effects.

When the pixel matrix is two-dimensional, one way of quantizing the variations in the times of occurrence of the events of the selected set as a function of the positions of the pixels comprises determining a plane exhibiting a minimum distance with respect to the events of the selected set in the space-time representation. In the case where the pixel matrix is one-dimensional, it is a straight line and not a plane that is to be determined in space-time representation.

To enrich the spatio-temporal analysis of the events detected by the pixels of the matrix, one possibility is to include in the quantization of the variations an estimation of second-order derivatives that the events of the selected set exhibit in space-time representation around the place of estimation.

In an embodiment, for each pixel of the matrix, the time of occurrence of the most recent event originating from this pixel is memorized. The selection of the set of events for a place of estimation and an estimation time can then comprise the inclusion in this set of each event having a time of occurrence in the time interval defined with respect to the estimation time and memorized for a pixel of the spatial neighborhood of the place of estimation. This type of method allows a simple and fast implementation of the method.

In an embodiment, the steps of selecting a set of events and of quantizing the variations in the times of occurrence are executed by taking as place of estimation the position of a pixel where an event is detected and as estimation time an instant of detection of this event. It is thus possible to reach a very high speed of estimation of the optical flow in the relevant regions of the pixel matrix where activity is observed.

In particular, the selection of the set of events can be carried out in response to detection of an event originating from a pixel of the matrix at an instant of detection. In order to filter out events that in all likelihood represent only noise, it is then possible to proceed with the quantization of the variations in the times of occurrence to update motion information on condition that the set of events contains a number of events above a threshold.

Another aspect of the present invention relates to a device for estimating optical flow, comprising:
  a light sensor having a pixel matrix to be arranged facing a scene and adapted to deliver asynchronous information comprising, for each pixel of the matrix, successive events originating from this pixel and depending on light variations in the scene; and
  a computer to execute the following steps for a place of estimation in the pixel matrix and an estimation time:
    selecting a set of events originating from pixels comprised in a spatial neighborhood of the place of estimation and having arisen in a time interval defined with respect to the estimation time, the set having at most one event per pixel of the spatial neighborhood; and
    quantizing variations in the times of occurrence of the events of the selected set as a function of the positions, in the matrix, of the pixels from which these events originate.

BRIEF DESCRIPTION OF THE DRAWINGS

Other features and advantages of the present invention will become apparent in the description below of a non-limiting exemplary embodiment, with reference to the appended drawings, wherein.

DESCRIPTION OF EMBODIMENTS

Figure 1:
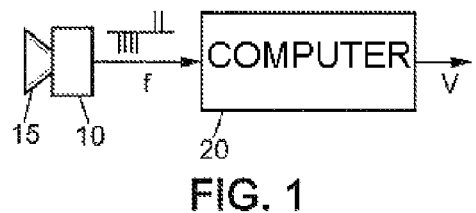
FIG. 1 is a block diagram of a device for estimating optical flow adapted to implementation of the invention.

The device for estimating optical flow represented in FIG. 1 includes an event-based asynchronous vision sensor 10 placed facing a scene and receiving the luminous flux from the scene through collection optics 15 comprising one or more lenses. The sensor 10 is placed in the image plane of the collection optics 15. It includes an array of photosensitive elements organized into a pixel matrix. Each pixel corresponding to a photosensitive element produces successive events depending on light variations in the scene.

A computer 20 processes the asynchronous information f output by the sensor 10, i.e. the sequences of events received asynchronously from the various pixels, to extract therefrom the information V on the optical flow observed in the scene. The computer 20 operates on digital signals. It can be implemented by programming an appropriate processor. A hardware implementation of the computer 20 using specialized logic circuits (ASIC, FPGA etc.) is also possible.

For each pixel of the matrix, the sensor 10 generates an event-based asynchronous signal sequence on the basis of the light variations sensed by the pixel in the scene appearing in the field of vision of the sensor. Such an asynchronous photosensitive sensor makes it possible in certain cases to approach the physiological response of a retina. It is then known by the acronym DVS (Dynamic Vision Sensor).

Figure 2A:
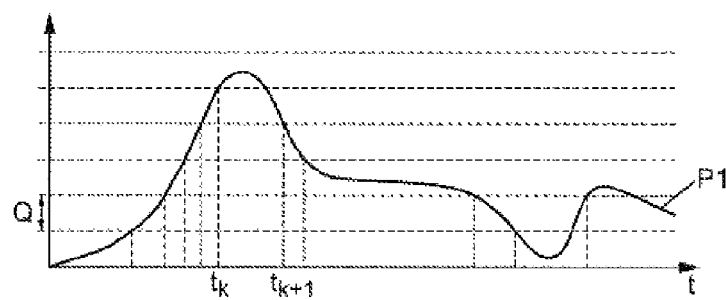
FIG. 2A is a diagram showing an example of a luminous intensity profile at the level of a pixel of an asynchronous sensor.
Figure 2B:
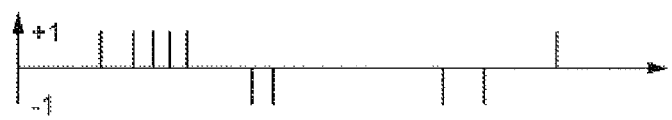
FIG. 2B shows an example of a signal output by the asynchronous sensor in response to the intensity profile in FIG. 2A.
Figure 2C:
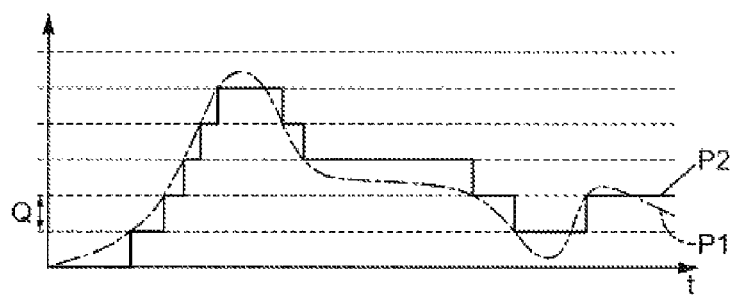
FIG. 2C illustrates the reconstruction of the intensity profile from the signal in FIG. 2B.

The principle of acquisition by this asynchronous sensor is illustrated by FIGS. 2A-C. The information consists in a succession of times $t_k$ (k=0, 1, 2, . . . ) at which an activation threshold Q is reached. FIG. 2A shows an example of a luminous intensity profile P1 seen by a pixel of the matrix of the DVS. Each time this intensity increases by a quantity equal to the activation threshold Q from what it was at time $t_k$, a new instant $t_{k+1}$ is identified and a positive spike (level +1 in FIG. 2B) is emitted at this instant $t_{k+1}$. Symmetrically, each time that the intensity of the pixel decreases by the quantity Q from what it was at time $t_{k'}$, a new instant $t_{k'+1}$ is identified and a negative spike (level −1 in FIG. 2B) is emitted at this instant $t_{k'+1}$. The asynchronous signal sequence for the pixel then consists in a succession of positive or negative pulses or spikes positioned in time at the instants $t_k$ depending on the luminous profile for the pixel. These spikes can be mathematically represented by positive or negative Dirac peaks and each characterized by an instant of emission $t_k$ and a sign bit. The output of the DVS 10 is thus in the form of an address-event representation (AER). FIG. 2C shows the intensity profile P2 that can be reconstructed as an approximation of the profile P1 by integration over time of the asynchronous signal in FIG. 2B.

Figure 3A:
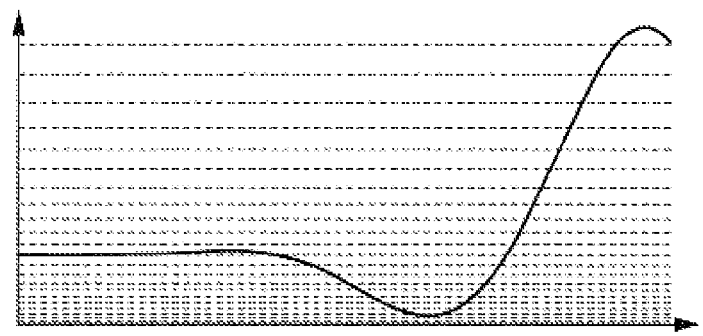
FIGS. 3A-B are diagrams analogous to those in FIGS. 2A-B illustrating a light collection mode that can be used in another exemplary embodiment of the method.
Figure 3B:
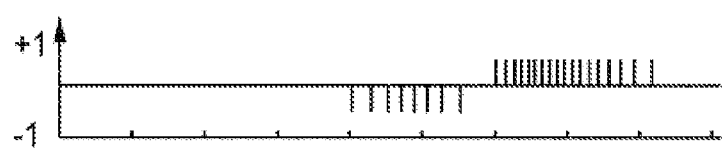

The activation threshold Q can be fixed, as in the case of FIGS. 2A-C, or adaptive as a function of the luminous intensity, as in the case of FIGS. 3A-B. For example, the threshold ±Q can be compared to the variations in the logarithm of the luminous intensity for the generation of a ±1 event.

By way of example, the DVS 10 can be of the kind described in "A 128×128 120 dB 15 μs Latency Asynchronous Temporal Contrast Vision Sensor", P. Lichtsteiner, et al., IEEE Journal of Solid-State Circuits, Vol. 43, No. 2, February 2008, pp. 566-576, or in the patent application US 2008/0135731 A1. The dynamic of a retina (minimum duration between action potentials) in the order of a few milliseconds can be suitably reproduced with a DVS of this type. The dynamic performance is in any case largely above that which can be reached with a conventional video camera with a realistic sampling frequency.

It should be noted that that the shape of the asynchronous signal delivered for a pixel by the DVS 10, which constitutes the input signal of the computer 20, can be different from a succession of Dirac peaks, the events represented being able to have a temporal width or an amplitude or a waveform of any kind in this event-based asynchronous signal.

Note that the method proposed here is applicable to other types of DVS, and also to light sensors, the output signals of which are generated according to an address-event representation without necessarily seeking to reproduce the behavior of the retina.

Figure 4:
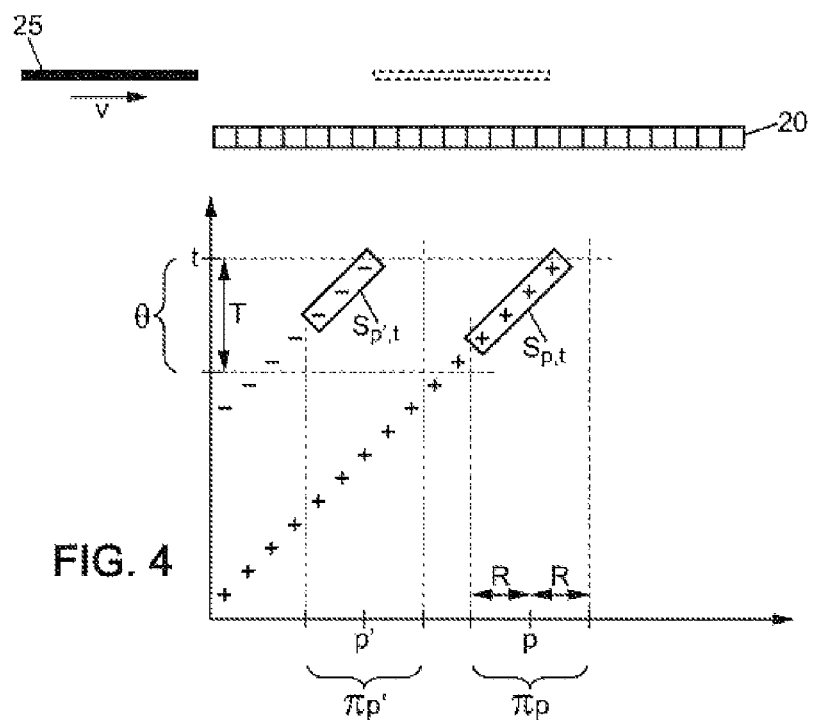
FIG. 4 is a diagram illustrating an embodiment of the method for estimating optical flow.

FIG. 4 shows very schematically a one-dimensional asynchronous sensor 20, i.e. a sensor composed of a row of pixels, in front of which an object 25 travels at a velocity v. It is assumed that the arrival of the front edge of the object 25 in front of a pixel generates an ON event (marked "+" in FIG. 4) in this pixel and that the back edge of the object 25 generates an OFF event (marked "−" in FIG. 4) as it passes in front of the pixel. We consider the optical flow seen by the sensor 10 at a place of estimation p and at an estimation time t. In this respect, one may consider a spatial neighborhood $\pi_p$ of the place of estimation p, as well as a time interval θ defined with respect to the estimation time t. In the case represented in FIG. 4, the neighborhood $\pi_p$ is of the form $\pi_p$=[p−R, p+R], and the time interval θ is a period of predefined duration T ending at the estimation time: θ=[t−T, t].

FIG. 4 also shows the set $S_{p,t}$ of the events received from the pixels of the sensor 10 originating from the spatial neighborhood $\pi_p$ in the time interval θ. It can be seen in the space-time representation of the graph situated in the lower part of FIG. 4, that the events of the set $S_{p,t}$ are aligned. The slope of the straight line passing through these events indicates the velocity v of the front edge of the object 25 seen by certain pixels of the sensor 10. This velocity v is also found at other points of the sensor that have seen the back edge of the object 25 pass during the time interval θ. It is specifically the slope of the events of the set $S_{p',t}$ received from the pixels of the sensor 10 originating from the spatial neighborhood $\pi_{p'}$ of another place of estimation p' in the time interval θ.

In practice, the ON or OFF events sent by the pixels of the sensor 10 do not have the temporal regularity represented in the idealized schema in FIG. 4. On the contrary, the times of occurrence of the events have a relatively chaotic behavior due to the not entirely predictable electron states inside the photosensitive elements of the sensor as well as the acquisition noise. Thus, the events of the set $S_{p,t}$ typically have a dispersion around the straight line, the slope of which represents the optical flow at point (p, t). This does not prevent the estimation of the slope that the events of the set $S_{p,t}$ exhibit in space-time representation. One possibility is to determine the straight line that best fits the points of the set $S_{p,t}$ in the sense of least squares, with where applicable a heavier weighting of the positions of the pixels closest to the place of estimation p. The slope of this straight line can then be determined, then inverted to supply an estimation of velocity in the field of vision of the sensor 10.

The slope can also be estimated quickly by convolution of the times of occurrence of the events of the set $S_{p,t}$ with a spatial differentiation kernel. In such a case, it can be desirable to attenuate the effects of the noise by applying, before the convolution kernel, a smoothing operation to the set of events $S_{p,t}$ in the space-time representation. The smoothing can notably be carried out by applying a median filter.

Figure 5:
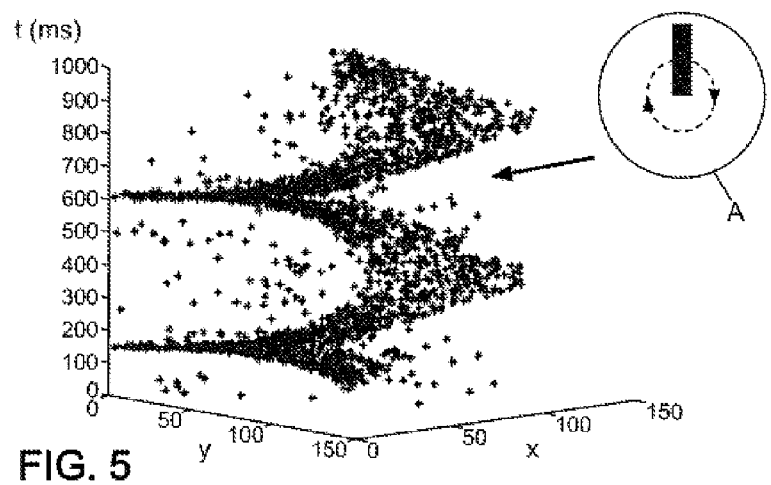
FIG. 5 is a diagram showing events generated by an asynchronous sensor placed facing a scene including a rotating bar.
Figure 6:
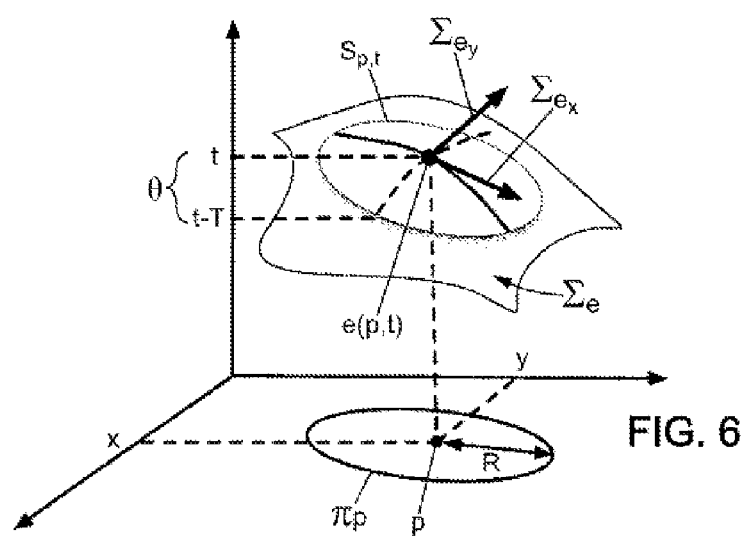
FIG. 6 is a diagram illustrating another embodiment of the method for estimating optical flow.

In imaging applications, the pixel matrix of the sensor 10 is more often two-dimensional than one-dimensional. The space-time representation in which the ON or OFF events originating from the pixels can be placed is then a representation in three dimensions such as that presented in FIG. 5. In this figure, each point indicates an event generated asynchronously at an instant t at a pixel of the sensor, of position $$\begin{pmatrix} x \\ y \end{pmatrix},$$

by the motion of a rotating bar with a constant angular velocity as schematized in the box A. The majority of these points are distributed in proximity to a surface of general helicoidal shape. However, the points are not exactly aligned on this surface given the chaotic behavior mentioned above. Furthermore, the figure shows a certain number of events away from the helicoidal surface that are measured while not corresponding to the effective motion of the bar. These events are acquisition noise.

More generally, in the presence of motion of one or more objects in the field of vision of the sensor 10, events appear in three-dimensional representation (x, y, t), and we look for the optical flow corresponding to this motion.

An event arising at time t at a pixel situated at the site $$p = \begin{pmatrix} x \\ y \end{pmatrix}$$

is denoted e(p, t). The value of e(p, t) is +1 or −1 according to the ON (positive change in contrast) or OFF (negative change in contrast) polarity of the event. Once again, a spatial neighborhood $\pi_p$ of the pixel p: $\pi_p = \{p'/\|p'-p\| \leq R\}$ and a time interval $\theta = [t-T, t]$ can be defined, and one may consider the events originating from pixels in the neighborhood $\pi_p$ in the time interval $\theta$, by retaining for each pixel only the most recent event (if there is an event during the interval $\theta$). In this way a set of events $S_{p,t}$ is constructed that can be seen as a portion, lying within the volume $\pi_p \times \theta$, of a surface $\Sigma_e$ in the space-time representation of the events.

For each pixel p of the matrix, the time of occurrence of the last observed event is memorized. It is then possible to define the function that allocates to each position p the time of occurrence $\Sigma_e(p)$ of the most recent event at this position. The surface $\Sigma_e$ is a representation of this function in three-dimensional space. It is a surface that is ascending as a function of time. The points of this surface $\Sigma_e$ whose projections in the plane of the pixel matrix are outside the spatial neighborhood $\pi_p$ and those whose projection on the time axis is outside the interval $\theta$ are eliminated, when selecting the set of events $S_{p,t}$.

The computer 20 then estimates the partial derivatives of the surface $\Sigma_e$ at the point e(p, t) with respect to the two spatial parameters x and y:

$$\Sigma_{e_x} = \frac{\partial \Sigma_e}{\partial x} \text{ and } \Sigma_{e_y} = \frac{\partial \Sigma_e}{\partial y}.$$

These partial derivatives indicate the slope that the events of $S_{p,t}$ exhibit around the place of estimation. Around e(p, t), i.e. in the portion of surface that $S_{p,t}$ represents, $\Sigma_e$ can be written:

$$\Sigma_e(p + \Delta p) = \Sigma_e(p) + \nabla \Sigma_e \cdot \Delta p + o(\|\Delta p\|)$$

where $$\nabla \Sigma_e = \left( \frac{\partial \Sigma_e}{\partial x}, \frac{\partial \Sigma_e}{\partial y} \right).$$

The partial derivatives of $\Sigma_e$ are functions of a single variable x or y. Time being a strictly increasing function, $\Sigma_e$ is a surface of non-zero derivatives at each point. The inverse function theorem can then be used to write, around a position $$p = \begin{pmatrix} x \\ y \end{pmatrix}: \begin{array}{l} \frac{\partial \Sigma_e}{\partial x}(x, y_0) = \frac{d\Sigma_e|_{y=y_0}}{dx}(x) = \frac{1}{v_x(x, y_0)} \\ \frac{\partial \Sigma_e}{\partial y}(x_0, y) = \frac{d\Sigma_e|_{x=x_0}}{dy}(y) = \frac{1}{v_y(x_0, y)} \end{array}$$

where $\Sigma_{e|x=x_0}$ and $\Sigma_{e|y=y_0}$ are $\Sigma_e$ restricted to x at $x_0$ and to y at $y_0$, respectively. The gradient $\nabla \Sigma_e$ can then be written $\nabla \Sigma_e = (1/v_x, 1/v_y)$, which gives the inverses of the pixel velocities $v_x$, $v_y$ of the events as a function of time.

In a manner analogous to the preceding case, the quantization of the variations of the times of occurrence of the events can include determining a plane having a minimum distance, in the sense of least squares, with respect to the events of the set $S_{p,t}$ in space-time representation. The components of the gradient $\nabla \Sigma_e$ can also be estimated by convolution with differentiation kernels over x and y, where applicable after a smoothing operation.

To complete the information of the optical flow, the computer 20 can further conduct an estimation of second-order derivatives $\Sigma_e$ around the point e(p, t). This information on second-order derivatives accounts for the accelerations observable in the field of vision of the sensor 10. Second-order derivatives $$\frac{\partial^2 \Sigma_e}{\partial x^2}, \frac{\partial^2 \Sigma_e}{\partial x \partial y} \text{ and } \frac{\partial^2 \Sigma_e}{\partial y^2}$$

represent the local curvature of the surface $\Sigma_e$ which supplies a measurement of the apparent frequency of an event. If the curvature is zero, the event occurs at a fixed rate in the focal plane. Increases or decreases in the curvature relate to the accelerations of the edges generating events in the scene.

In the preceding example the set $S_{p,t}$ of events selected for a given place of estimation p and estimation time t is composed of events of any polarity (ON or OFF). The time of occurrence of the most recent event, ON or OFF, originating from each pixel is memorized in relation with the position of this pixel, which makes it possible to always include in the sets $S_{p,t}$ only the latest events seen by the pixels of the matrix. Cases can occur where $S_{p,t}$ includes events of different polarities. These cases give rise to a few errors, relatively rare, in the estimated slopes, which do not strongly disturb the measurements.

To reduce the number of these cases, one possibility is to include in the sets of events $S_{p,t}$ only events of the same polarity. In particular, it is possible to memorize two tables for the various pixels of the matrix, one containing the time of occurrence of the most recent ON events, the other containing the times of occurrence of the most recent OFF events. In such an embodiment, the reception at a time t of an event having a given polarity, ON or OFF, at a pixel of position p causes the construction of a set $S_{p,t}$ composed of each event having this polarity whose time of occurrence lies in the interval $\theta = [t-T, t]$ and memorized for a pixel of the neighborhood $\pi_p$. The computer can then conduct an estimation of the first and/or second-order derivatives in the set $S_{p,t}$ thus formed.

The moments at which the computer 20 performs quantization of the variations of the times of occurrence of events around a given pixel position can be chosen as a function of the arrival of the events on this pixel.

For example, on receiving an event e(p, t) originating from a pixel of position p in the matrix, at an instant of detection t, the computer 20 updates the table where the times of occurrence of the most recent events are stored (by replacing by t the preceding value of the table at the position p), then determines if the set $S_{p,t}$ includes enough recent events to be able to perform a reasonable estimation of the motion. To do this, the computer 20 can count the times of occurrence, memorized in the table for the pixel positions in the spatial neighborhood $\pi_p$, that fall within the time interval θ. If the number of times of occurrence thus determined is below a predefined threshold α, no quantization of the variations in the times of occurrence is carried out, the event that has just been detected being considered as noise. On the other hand, if the threshold α is exceeded, it is estimated that the surface $\Sigma_e$ contains enough points close to e(p, t) to be able to perform a slope estimation in order to quantize the variations in the times of occurrence. The threshold a is typically defined as a proportion (for example 10 to 30%) of the number of pixels that the sensor includes in the spatial neighborhood $\pi_p$.

In the preceding exemplary embodiments, two parameters R and T are to be adjusted to conduct optical flow estimations. The choice of these parameters depends on the physical characteristics of the sensor (spacing between pixels, response time) and on the order of magnitude of the dimensions and velocities, in the image plane, of the objects whose motion one wishes to detect. By way of example, and without this being in any way limiting, the spatial neighborhood can be dimensioned with a radius R in the order of 3 to 5 pixels in the plane of the matrix, and the duration T of the time interval θ can be in the order of 500 µs to 2 ms. This choice depends on the hardware used and the application.

The exemplary embodiments described above are illustrations of the present invention. Various modifications can be made to them without departing from the scope of the invention as defined by the appended claims.

The invention claimed is:

1. A method for estimating optical flow, comprising:
   receiving asynchronous information originating from a light sensor having a pixel matrix arranged facing a scene, the asynchronous information comprising, for each pixel of the matrix, successive events originating from said pixel and depending on light variations in the scene;
   for a place of estimation in the pixel matrix and an estimation time, selecting a set of events originating from pixels lying in a spatial neighborhood of the place of estimation and having arisen in a time interval defined with respect to the estimation time, the set having at most one event per pixel of the spatial neighborhood; and
   quantizing variations in the times of occurrence of the events of the selected set as a function of positions, in the matrix, of the pixels from which said events originate.

2. The method as claimed in claim 1, wherein the quantization of the variations comprises estimating a slope that the events of the selected set exhibit in a space-time representation around the place of estimation.

3. The method as claimed in claim 2, comprising, before estimating the slope, a smoothing operation, in space-time representation, on the selected set of events.

4. The method as claimed in claim 2, wherein the pixel matrix is two-dimensional and the quantization of the variations comprises determining a plane exhibiting a minimum distance with respect to the events of the selected set in the space-time representation.

5. The method as claimed in claim 2, wherein the pixel matrix is one-dimensional and the quantization of the variations comprises determining a straight line exhibiting a minimum distance with respect to the events of the selected set in space-time representation.

6. The method as claimed in claim 2, wherein the quantization of the variations further comprises estimating second-order derivatives that the events of the selected set exhibit in the space-time representation around the place of estimation.

7. The method as claimed in claim 1, wherein the events originating from pixels of the matrix each have a polarity from among several possible polarities, and wherein the set of events selected for the place of estimation and the estimation time is composed of events of any polarity.

8. The method as claimed in claim 1, wherein, for each pixel of the matrix, the time of occurrence of the most recent event originating from said pixel is memorized, and wherein the selection of the set of events for the place of estimation and the estimation time comprises:
   including in said set each event having a time of occurrence in said time interval defined with respect to the estimation time and memorized for a pixel of said spatial neighborhood of the place of estimation.

9. The method as claimed in claim 1, wherein the events originating from the pixels of the matrix each have a polarity from among two possible polarities, and wherein the set of events selected for the place of estimation and the estimation time is composed of events of the same polarity.

10. The method as claimed in claim 9, wherein, for each pixel of the matrix and each possible polarity, the time of occurrence of the most recent event originating from said pixel with said polarity is memorized, and wherein the selection of the set of events for the place of estimation and the estimation time comprises, following receipt of an event having a given polarity at the place of estimation:
    including in said set each event having the given polarity and a time of occurrence in the time interval defined with respect to the estimation time and memorized for a pixel of the spatial neighborhood of the place of estimation.

11. The method as claimed in claim 1, wherein said time interval is a period of predefined duration ending at the estimation time.

12. The method as claimed in claim 1, wherein the steps of selecting a set of events and of quantizing variations in the times of occurrence are executed by taking as place of estimation the position of a pixel where an event is detected and as estimation time an instant of detection of said event.

13. The method as claimed in claim 12, wherein the selection of the set of events is carried out in response to detection of an event originating from a pixel of the matrix at an instant of detection, and wherein the quantization of the variations in the times of occurrence is carried out to update motion information on condition that the set of events contains a number of events above a threshold.

14. A device for estimating optical flow, comprising:
    a light sensor having a pixel matrix to be arranged facing a scene and adapted to output asynchronous information comprising, for each pixel of the matrix, successive events originating from said pixel and depending on light variations in the scene; and
    a computer to execute the following steps for a place of estimation in the pixel matrix and an estimation time:
        selecting a set of events originating from pixels lying in a spatial neighborhood of the place of estimation and having arisen in a time interval defined with respect to the estimation time, the set having at most one event per pixel of the spatial neighborhood; and
        quantizing variations in the times of occurrence of the events of the selected set as a function of positions, in the matrix, of the pixels from which said events originate.

15. The device as claimed in claim 14, wherein the quantizing variations in the times of occurrence comprises estimating a slope that the events of the selected set exhibit in a space-time representation around the place of estimation.

16. The device as claimed in claim 15, further comprising, before estimating the slope, a smoothing operation, in space-time representation, on the selected set of events.

17. The device as claimed in claim 15, wherein the pixel matrix is two-dimensional and the quantizing variations in the times of occurrence comprises determining a plane exhibiting a minimum distance with respect to the events of the selected set in the space-time representation.

18. The device as claimed in claim 15, wherein the pixel matrix is one-dimensional and the quantizing variations in the times of occurrence comprises determining a straight line exhibiting a minimum distance with respect to the events of the selected set in space-time representation.

19. The device as claimed in claim 14, wherein, for each pixel of the matrix, the time of occurrence of the most recent event originating from said pixel is memorized, and wherein the selecting a set of events comprises:

including in said set each event having a time of occurrence in said time interval defined with respect to the estimation time and memorized for a pixel of said spatial neighborhood of the place of estimation.

20. The device as claimed in claim 14, wherein the steps of selecting a set of events and of quantizing variations in the times of occurrence are executed by taking as place of estimation the position of a pixel where an event is detected and as estimation time an instant of detection of said event.

21. The device as claimed in claim 20, wherein the selecting a set of events is carried out in response to detection of an event originating from a pixel of the matrix at an instant of detection, and wherein the quantizing variations in the times of occurrence is carried out to update motion information on condition that the set of events contains a number of events above a threshold.

* * * * *